United States Patent [19]

Gordon et al.

[11] Patent Number: 4,763,191
[45] Date of Patent: Aug. 9, 1988

[54] DIAL-UP TELEPHONE NETWORK EQUIPMENT FOR REQUESTING AN IDENTIFIED SELECTION

[75] Inventors: Travis H. Gordon, Madison; Steven D. Simon; Robert Sorrentino, both of Middletown, all of N.J.

[73] Assignee: American Telephone and Telegraph Company, AT&T Bell Laboratories, Murray Hill, N.J.

[21] Appl. No.: 840,375

[22] Filed: Mar. 17, 1986

[51] Int. Cl.[4] .................. H04M 11/08; H04M 15/00; H04N 7/10; H04H 9/00
[52] U.S. Cl. ...................................... 358/86; 379/94; 379/246; 379/105; 455/4
[58] Field of Search ................ 358/84, 86, 85; 455/2, 455/4, 5; 179/2 A, 2 AS, 2 CA, 2 DP, 5.5, 6.3 MA, 18 B, 18 FH; 379/91–94, 101, 102, 104, 105, 127, 142, 201, 246, 207

[56] References Cited

U.S. PATENT DOCUMENTS

| | | | |
|---|---|---|---|
| 3,484,560 | 12/1969 | Jaeger | 179/27 |
| 3,570,008 | 3/1971 | Downing | 364/200 |
| 3,920,908 | 11/1975 | Kraus | 179/2 CA |
| 4,165,446 | 8/1979 | Flowers et al. | 179/2 DP |
| 4,166,929 | 9/1979 | Sheinbein | 179/18 BG |
| 4,191,860 | 3/1980 | Weber | 179/18 B |
| 4,357,493 | 11/1982 | Anderson | 179/6.04 |
| 4,506,111 | 3/1985 | Takenouchi et al. | 179/2 A |
| 4,518,989 | 5/1985 | Yabiki et al. | 358/86 |
| 4,530,008 | 7/1985 | McVoy | 356/86 X |
| 4,555,594 | 11/1985 | Friedes | 179/18 B |
| 4,590,516 | 8/1986 | Abraham | 358/86 |
| 4,611,096 | 9/1986 | Asmuth et al. | 379/207 |

FOREIGN PATENT DOCUMENTS

| | | | |
|---|---|---|---|
| WO85/03830 | 8/1985 | PCT Int'l Appl. | 358/85 |
| 87/04884 | 8/1987 | PCT Int'l Appl. | 379/94 |

OTHER PUBLICATIONS

Zenith Electronics, "Advanced New Cable TV Technology Developed for Impulse-Pay-Per-View", press release issued Jun. 3, 1985 in Las Vegas, Nev., Zenith Electronics, Glenview, Ill.; copy obtained from Dialog Database File 621.

Semir Sirazi, "Comparative Study of Hybrid—IPPV Implementations", presented at Cable 85 on Jun. 3, 1985, Las Vegas, Nev.

Berger et al, "New Customer-Defined Network Service", Telephony, Mar. 10, 1986, pp. 50, 52, 54, 58, 60.

A. F. Bulfer, "Dial-a-View", View Graph, Dec. 4 & 5, 1984, Motion Picture Seminar, Los Angeles, Calif.

A. F. Bulfer, "Dial-a-View", Talk, Dec. 4 & 5, 1984.

A. F. Bulfer, "Questions and Answers on Dial-a-View", Dec. 4 & 5, 1984.

(List continued on next page.)

Primary Examiner—Keith E. George
Attorney, Agent, or Firm—Richard J. Godlewski

[57] ABSTRACT

A method and an arrangement are disclosed for providing a nationwide dial-a-view service in which a caller desiring a given viewing selection dials an "800" dial-a-view number for ordering that selection through the telephone networking arrangement. The arrangement includes local and toll switching offices for accessing a centralized database system for providing routing instructions advantageously to network services equipment which acknowledges the request and processes the request to cable television distribution equipment. The dialed "800" number is recognized as a dial-a-view request, and the database system provides the originating toll office with routing instructions for sending the request to the network service equipment. Automatic number identification of the caller is requested from the originating toll office and forwarded along with requested programming to the vendor equipment. The vendor equipment supplies the requested programming to the calling customer via an addressable decoder at the calling customer's television. The vendor equipment also perform customer order entitlement verification prior to supplying the calling customer with the requested programming.

50 Claims, 3 Drawing Sheets

OTHER PUBLICATIONS

R. J. Frank, R. J. Keevers, F. B. Strebendt, and J. E. Waninski, "No. 4 ESS TM :Mass Announcement Capability", *Bell System Technical Journal*, vol. 60, No. 6, Jul.-Aug. 1981, pp. 1078.

*Network Communications Applications & Services* (AT&T Manual), Issue 4, Dec. 1986, "The Consultant Liason Program".

*Network Communications Applications and Services* (AT&T Manual), "Dial-it* 900 Service", Section 4.5.1, pp. 1-9.

*Cable and the Telcos: From Confrontation to Detente*, Report 83-1, The Yankee Group, Boston, Mass., Jun. 1983, pp. 162-167.

"A Trial of a National Pay-Per-View Ordering and Billing System", *Cable* 86, 1986 NCTA Technical Papers, A. E. Bulfer et al., Dallas, Tex., Mar. 15-18, 1986, pp. 1-6.

J. Magara et al., "Advanced Video Response System--Phase III", 2254 2254 *Japan Telecommunications Review*, vol. 23, No. 3, Jul. 1981, Tokyo, Japan, pp. 243-249.

DIAL-UP TELEPHONE NETWORK EQUIPMENT FOR REQUESTING AN IDENTIFIED SELECTION

This application is related to the application of R. W. Foster et al., Ser. No. 781,895, filed Sept. 26, 1985 and entitled "A Method of and An Arrangement for Forwarding a Customer Order".

TECHNICAL FIELD

This invention relates to telecommunications systems and particularly to a pay-per-view subscription television service furnished to a customer on a dial-up basis through a telephone system.

BACKGROUND OF THE INVENTION

Pay-per-view is a form of subscription TV service that allows viewers to select specific programs to watch and to pay only for them. This differs from presently available subscription TV systems that provide access to all programs on a channel for a flat fee.

Cable and broadcast vendors have long recognized that pay-per-view TV holds enormous potential for them, but they have not been able to capitalize on that potential. Prior art arrangements have needed too much capital to finance program ordering, program distribution, and customer billing systems. However, despite these challenges and high costs, subscription TV companies are installing devices on customer premises for enabling customers to receive pay-per-view programming.

The present invention is directed to making the pay-per-view technology and marketing more affordable to operators and customers on a dial-up basis via telephone networking and centralized facilities for order routing, customer entitlement verification, charging and billing, and program distribution and delivery control.

A co-pending application, R. W. Foster et al., Ser. No. 781,895, filed Sept. 26, 1985, and assigned to the same assignee of the present application, is directed to a pay-per-view arrangement for ordering local CATV viewing selections through a local office telephone switching system.

A problem with existing subscription TV service is that it is generally restricted to local networking and no facilities are available for providing nationwide dial-up subscription TV service from any telephone or telecommunications system. Another problem is that local subscription TV service is commonly provided on a monthly fee per channel basis for a given period of time without having facilities to selectively provide individual per channel programming on a dial-up and pay-per-view basis. In those few instances where individual programming is available on a dial-up basis, telephone orders are usually handled by operators or special order entry equipment. Such arrangements are prohibitively costly particularly for handling customer requests during heavy program ordering periods.

Another problem is that billing records for network calls are usually kept at either an originating or terminating local network office where they are compiled and forwarded to a regional processing center to charge the calling customer for the call. No centralized facilities are available to derive and compile records on a toll network basis. Even charges recorded for "800" IN-WATS calls for collected at the terminating local office.

Still another problem is that telephone networks are not equipped to provide vendor equipment with caller identification and requested service information on a centralized basis. Prior art arrangements would simply forward all calls directly to a service vendor identified by the dialed number. Prior art networks do not process calls to centralized network facilities and collect service and caller identification for service vendors.

Additionally, even if prior art arrangement were equipped to process service requests and caller information on a centralized basis to vendor equipment, the prior art vendor equipment is not equipped to process calls such as "800" service calls from centralized network equipment.

SUMMARY OF THE INVENTION

The foregoing problems are solved and a technical advance is achieved by a communication networking arrangement in which a customer dials up through the nationwide telephone network economically to receive virtually unrestricted programming available from any television provider. The customer-dialed number controls service ordering and call routing to centralized network services equipment. The centralized vendor equipment checks service entitlement, caller program delivery, charging and billing.

A technical advance is that a caller desiring a viewing selection simply dials a toll free "800" dial-a-view number for ordering that selection through a telephone networking arrangement. The service vendor pays for the service indicating call to the network services equipment. The arrangement illustratively includes local and toll switching offices for accessing a network routing database system which identifies the call as a special dial-a-view programming request. In response, the routing database system provides routing instructions advantageously to centralized network services equipment which acknowledges the request and sends requested programming and caller identification information to subscription TV vendor distribution equipment.

A departure of the art is that when the dialed "800" number is recognized as a specific dial-a-view request, the routing database system provides the originating toll office with routing instructions for sending the request to the network services equipment which sends the program request to centralized vendor equipment. The service equipment then requests an automatic number identification of the caller from an originating telephone office and provides both caller identification and desired program selection information to the subscription TV vendor distribution equipment for supplying the service.

The network services equipment responds to the received information by sending an advisory signal or announcement to the caller such as "Thank you for requesting the service" and by signaling the subscription TV vendor distribution equipment to further process the customer request. The vendor distribution equipment does so by responding to caller identification information received over a data link from the network services equipment for verifying customer entitlement to the ordered service and for compiling the necessary delivery and charging information for that customer. After verifying the facts, the caller, if not entitled, will be informed that he is presently not subscribing to the service. At this time, the vendor is enabled to solicit a subscription to the service. With this solicitation, the customer may desire to pay for a subscription by dialing in a credit card number for verification and charging on the spot.

When service entitlement is verified, the customer order verification equipment within the vendor equipment sends instructions to a local subscription TV facility serving the calling customer so that the requested service is implemented at the advertised program delivery time. The centralized vendor distribution equipment also sends charging and billing instructions to vendor facilities, illustratively a cable TV vendor locally serving the caller, so that pay-per-view fees may be assessed to the caller. The local cable TV vendor illustratively may derive the requested programming from any one of a number of available satellite communications facilities linked up around the world. Where more than one local vendor provides services to a caller area, the vendor order verification equipment determines which vendor provides services to that caller and sends the order request to the appropriate vendor serving the caller.

An advantage of the method and apparatus provided by the present invention is that facilities are available on a centralized basis illustratively in a telephone toll network for serving virtually all subscribing television vendors and their customers. This enables vendor advertising on an nationwide basis with a minimal number of required ordering codes for pay-per-view services. The reduced number of codes aids the telephone company in its number planning. Centralized verification reduces service vendor expenses by eliminating the need for such verification on a local basis. The customer receives facile services by not being required to use an unwieldy number of vendor service numbers to obtain the service.

The centralized network services equipment is equipped to serve a number of nationwide subscription television vendors and to route customer orders to an appropriate one for serving that customer. When more than one such vendor is providing programming in the same time period, the service equipment is equipped with processing equipment for determining to which vendor a customer order is to be sent illustratively based on the dialed "800" number. The centralized vendor distribution equipment thereafter sends the caller number identification to the appropriate local TV vendor equipment which determines customer entitlement to the selection being offered by the nationwide vendor. The centralized network equipment includes programs and memory for deriving and storing charge records to charge for the call thereto and also to charge for compiling and delivering service requests and caller identification to the vendor equipment.

The vendor distribution equipment derives a program delivery message and a charging message for the requested programming in response to a data message from the network services equipment. Vendor transmission equipment such as a satellite facility communicates the messages to localized vendor equipment serving the calling customer. The local vendor equipment includes distribution equipment for supplying the requested programming to the calling customer in response to the program delivery message and billing equipment for charging the calling customer for the requested programming in response to the charge message. Alternatively, the customer order verification equipment is provided at the local vendor equipment to verify customer entitlement to requested programming from a number of centralized vendors that supply different dial-a-view programming.

The method of deriving call routing information from a network routing database system includes receiving at the database system a dial-a-view call message including the dial-a-view number indicating the television programming requested by the caller, and translating the call message into a routing message that uniquely identifies the call as a program request. The network routing database system then transmits the routing message to the network switching office for call routing. The network office then routes the call to centralized network services equipment which requests calling customer number identification information from the network office and returns an acknowledgment announcement to the calling customer. With receipt of the call, the network services equipment produces a billing record to charge the service vendor for the "INWATS 800" service call. In response to the receipt of the dial-a-view number and customer identification information, the network services equipment compiles a vendor data message including the program request and calling customer identification for service vendor equipment to supply the requested programming to the calling customer and to charge the calling customer for the requested programming. A billing record is also produced by the network services equipment to charge the service vendor for delivering the requested programming selection and calling customer identification to the vendor equipment. Another record is also produced to charge the vendor for the call to the network services equipment.

Another departure of the art is that billing for the service call and the delivery of program selection and calling customer identification information is performed on a centralized network basis. Billing equipment at the network services equipment provides bulk billing for each subscription TV vendor. Resultingly, bulk billing provides economies to the network operator as well as to the subscription TV vendor. The equipment for, and expense of, creating separate billing records at either an originating or terminating telephone office for each calling customer and the accompanying billing support equipment expense is eliminated.

Alternatively, routing translations and service call billing equipment may be provided at each originating toll office, thereby eliminating the need of the network routing database system. However, the cost of the service calls is transferred to the calling customer. In addition, centralized billing equipment is still required to bill the service vendor for supplying calling customer identification

DETAILED DESCRIPTION

Figure 1:
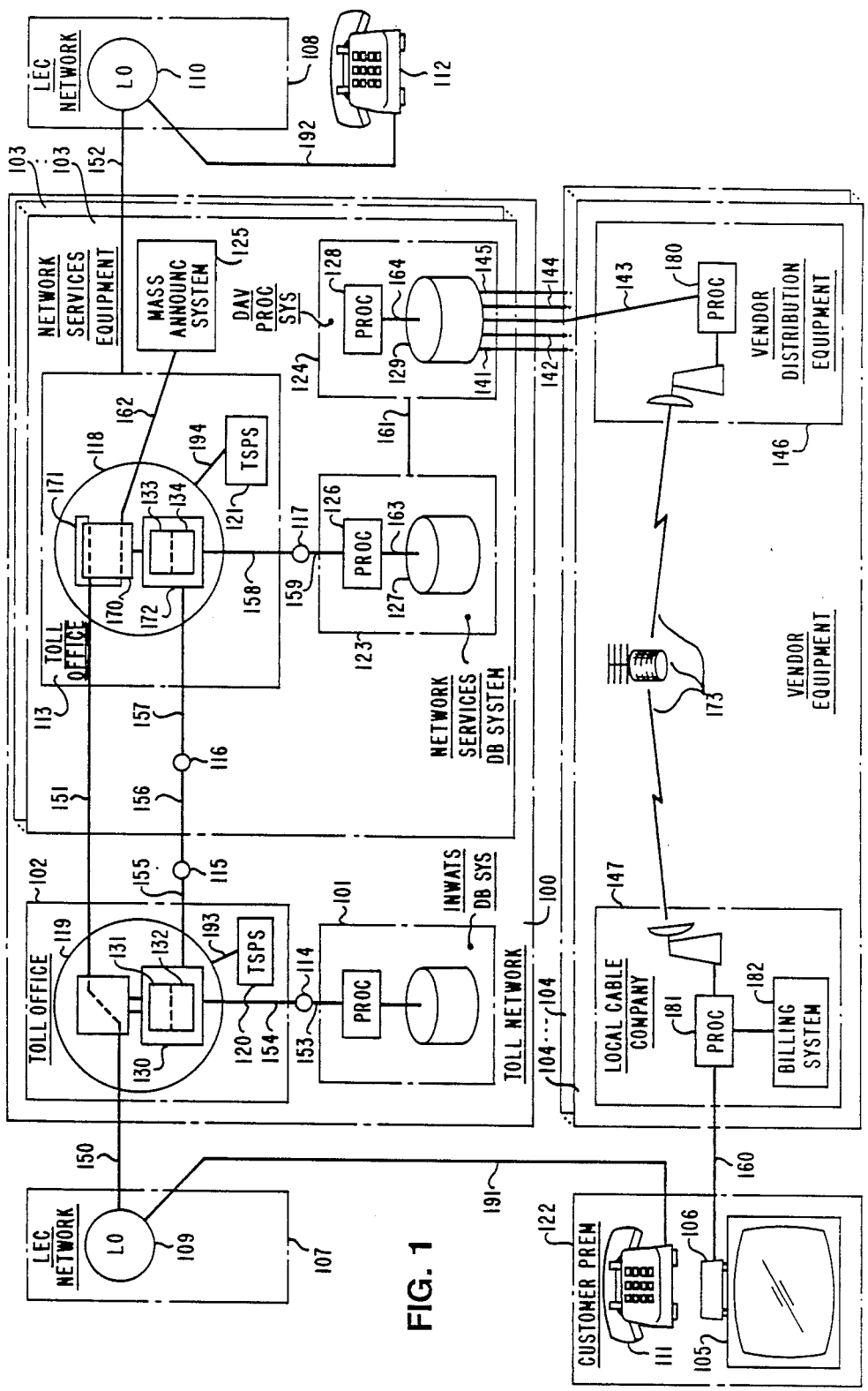
FIG. 1 depicts an illustrative toll telephone network including a nationwide dial-a-view arrangement and implementing an illustrative method for furnishing requested cable television programming on a dial-up basis.

Depicted in FIG. 1 is an illustrative toll telecommunications network 100. This toll network includes an illustrative nationwide dial-a-view networking arrangement through which a calling customer desiring a particular subscription television programming selection dials a "800" dial-a-view number to order that viewing selection. This networking arrangement utilizes an illustrative method of deriving call routing information from a network routing database system 101 for directing a dial-a-view call received by a toll network switching office 102 to centralized network services equipment 103. The nationwide dial-a-view networking arrangement includes network routing database system 101, toll switching office 102, and centralized network services equipment 103. In response to a vendor data message including the requested programming selection and the identity of the calling customer, vendor equipment 104 supplies the requested subscription television programming to the calling customer television 105 at customer premises 122 via a well-known addressable decoder 106 and coaxial cable 160.

The toll network, also commonly known as an interconnect carrier network, serves a plurality of local exchange carrier networks such as 107 and 108. Each of the local networks includes one or more local telephone offices such as 109 and 110 which in turn each serve a plurality of customers such as those at telephone station set 111 via customer line 191 and telephone station set 112 via customer line 192. The toll network includes a plurality of communication lines such as trunks 150–152 for communicating calls between the local exchange carrier networks. The toll network also includes a plurality of toll switching system offices such as 102 and 113, for selectively interconnecting the trunks in response to routing information, such as the telephone number of a called customer line provided by the calling customer. Toll offices 102 and 113 interconnected by trunk 151 serve respective local offices 109 and 110 via trunks 150 and 152, respectively.

The toll network also includes a well-known common channel signaling (CCS) system for transferring well-known billing control, routing and supervisory information messages separate from the voice messages that are transferred on trunks such as 150–152. The CCS system includes signal transfer points (STP) 114–117 and CCS data links 153–159 interconnected as shown. A typical CCS system is described in *The Bell System Technical Journal*, Vol. 57, No. 2, February, 1972. Substitution of the 2STP system commercially available from AT&T for the 1STP system described in the cited CCS system reference is recommended for high-volume message applications.

By way of example, each of local telephone offices 109 and 110 is suitably an electronic program-controlled switching system of the type disclosed in U.S. Pat. No. 3,570,008, issued to R. W. Downing et al., on Mar. 19, 1971, and similarly disclosed in *The Bell System Technical Journal*, Vol. 43, No. 5, Parts 1 and 2, September, 1964. An updated central processor suitable for use in this switching system is described in *The Bell System Technical Journal*, Vol, 56, No. 2, February, 1977. The cited references may be consulted for a more comprehensive understanding of the construction and operation of an electronic program-controlled local switching system office. These local switching system offices are also equipped to supply well-known automatic number identification (ANI) of a calling customer line to an originating toll switching office such as 102. A telephone interchange signaling protocol for supplying ANI from a local exchange carrier to a toll switching system office is described in U.S. Pat. No. 4,555,594, issued to Friedes et al., on Nov. 26, 1985.

Toll switching system offices 102 and 113 include respective stored program-controlled switching system 118 and 119, such as the 4ESS ™ digital switch with CCS facilities. This digital switch is described in detail in the *Bell System Technical Journal*, Vol. 56, No. 7, September, 1977, and Vol., 60, No. 6, Part 2, July–August, 1981. These references may be consulted for a more comprehensive understanding of the construction and operations of a toll switching system.

Toll switch 118 includes switching network 170 and central processor 172. The switching network interconnects incoming and outgoing communications in a well-known manner under control of program-controlled central processor 172. Central processor 172 includes well-known program instruction memory for controlling the operations of the switch and data memories 133 and 134 for deriving and compiling charge information to bill vendor equipment 104 for service calls and service information. In particular, data memory 133 under control of the processor stores charging and billing information for dial-a-view calls to the network services equipment. Data memory 134 stores charging and billing information for charges in supplying requested services and programming as well as calling customer identification to vendor equipment. These memories are also used to store temporary and permanent records for processing dial-a-view calls and the like. Toll switch 119 also contains a switching network and data memories 131 and 132 in central processor 130. These memories also store records similar to those described for memories 133 and 134 in switch 118.

Each of toll offices 102 and 113 may also include an operator system such 120 and 121, respectively, or have access to a remotely located operator system for processing operator-assisted calls. A typical operator system such as the traffic service position system for use with local and toll offices is described in *The Bell System Technical Journal*, Vol. 49, No. 10, December, 1970, and Vol. 58, No. 6, Part 1 of 2, July–August, 1977, and in U.S. Pat. No. 3,484,560 of R. J. Jaeger, Jr., issued Dec. 16, 1969. These operator systems are utilized to obtain calling customer line number identification via operator trunks such as 193 and 194 when a local telephone switching system office does not supply automatic number identification to the toll switch.

Network services equipment 103 includes toll switching system office 113, network services database system 123 and dial-a-view processing system 124 interconnected by data link 161, and well-known mass announcement system 125 connected to toll switching office 113 via communication line 162. Network servies database system 123 comprises processor 126 such as the AT&T 3B20D computer and disk storage memory 127 interconnected by common network interface communication ring 163 that are commercially available. Along with a system of programs, this system recognizes a dial-a-view call and autonomously forwards the calling customer line number identification and the dialed number indicating the requested cable television programming to dial-a-view processing equipment 124 via link 161. Alternatively, the network services data base system and dial-a-view processing equipment may be incorporated into toll switching system 118 in a well-known manner.

Similarly, dial-a-view processing equipment 124 includes processor 128 such as the AT&T 3B20D computer and disk storage memory 129 interconnected by common network interface communication rink 164 that are commercially available along with a system of programs to sort programming requests and the accompanying calling customer line number identification and to compile a vendor data message for the vendor equipment supplying the requested programming. In this particular arrangement, dial-a-view processing equipment 124 serves a number of different cable television vendors via individual output data ports such as 141–145. As shown, data port 143 is connected to vendor equipment 104 for communicating the vendor data message to centralized vendor distribution equipment 146 of vendor equipment 104. Alternatively, a single output port from toll switch 118 to each centralized vendor equipment may be provided. The switch would have the service features of the network services database and dial-a-view incorporated therein.

Well-known mass announcement system 125 may be locally connected to toll switching system 118 or remoted via communication line 162, as shown. The mass announcement system is fully described in *The Bell System Technical Journal,* Vol. 60, No. 6, Part 2, July–August, 1981, and in U.S. Pat. No. 4,537,493 issued to T. W. Anderson et al., on Nov. 2, 1982. The mass announcement system provides an advisory signal such as an acknowledgment announcement to calling customers requesting a particular cable television programming selection indicated by the number they dialed. In one embodiment, the voice path from the calling customer line is connected to remoted mass announcement system 125 through switching network 170 of toll switching system 118 via loop-around trunk 171. For call termination purposes, the remoted mass announcement system appears to the supervisory control program of the switch to be part of switch 118 with the use of loop-around trunk 171. This trunk is not required when the announcement system is physically present in office 113. Network services database can also cause the switch to connect the voice path of a call to a remoted MAS system and still collect ANI and program information. Well-known central processor 172 controls the establishment of this connection as well as the call processing operations of the switch.

Vendor equipment 104 comprises centralized vendor distribution equipment 146, local cable television vendor equipment 147 interconnected by a communication link such as satellite facility 173. Centralized vendor distribution equipment 146 comprises well-known data processing equipment 180 responsive to the receipt of the vendor data message from the dial-a-view processing equipment for deriving a program delivery message and a charging message for the requested program. These messages along with the requested programming are communicated to the local cable television vendor equipment via satellite facility 173.

The local cable television vendor equipment 147 includes well-known data processing equipment 181 which is responsive to the receipt of the program delivery message for supplying the requested programming to the calling customer. In addition, local vendor equipment 147 includes a well-known billing system 182 for compiling billing data to charge the calling customer for the requested programming in response to the receipt of the charging message from the centralized distribution equipment.

Figure 2:
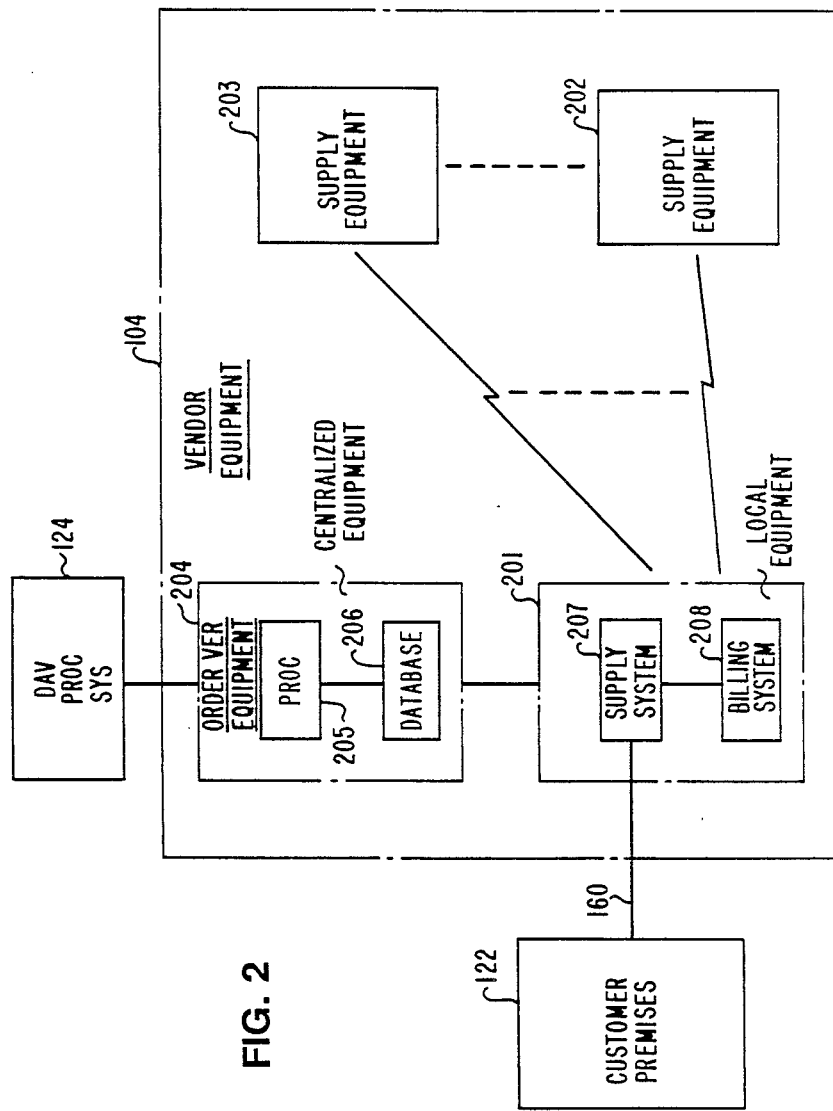
FIG. 2 depicts another embodiment of the vendor equipment of FIG. 1.

Depicted in FIG. 2 is another embodiment of vendor equipment 104. In this configuration, vendor equipment 104 includes local vendor equipment 201 to serve customer premises 122 via cable 160, a plurality of subscription TV vendor programming supply equipment providing individual programming via a plurality of satellite facilities such as 202 and 203, and centralized order verification equipment 204. Centralized customer order verification equipment 204 verifies customer entitlement to the requested programming indicated in the vendor data message and includes a processor 205 and a database 206 for storing the telephone number of subscribers of the various cable television vendors. Upon receiving a vendor data message including the identity of the requested programming along with the calling customer line number identification, processor 205 interrogates database 206 for determining the entitlement of the calling customer to the requested programming. Processor 205 can also perform verification on a dial-up basis of billing information supplied by a customer when notified that he/she is not entitled to the requested service.

When the calling customer is entitled to request the selected programming, processor 205 compiles a program delivery message and charging message for communication to local vendor equipment 201. Local vendor equipment 201 upon receipt of the program delivery message supplies selected programming from the appropriate program supply vendor to the calling customer. Local vendor equipment includes program distribution equipment 207 and billing system 208. In a well-known manner, distribution equipment 207 supplies the requested programming to the calling customer, and billing system 208 provides a billing record to charge the calling customer for the requested programming.

Figure 3:
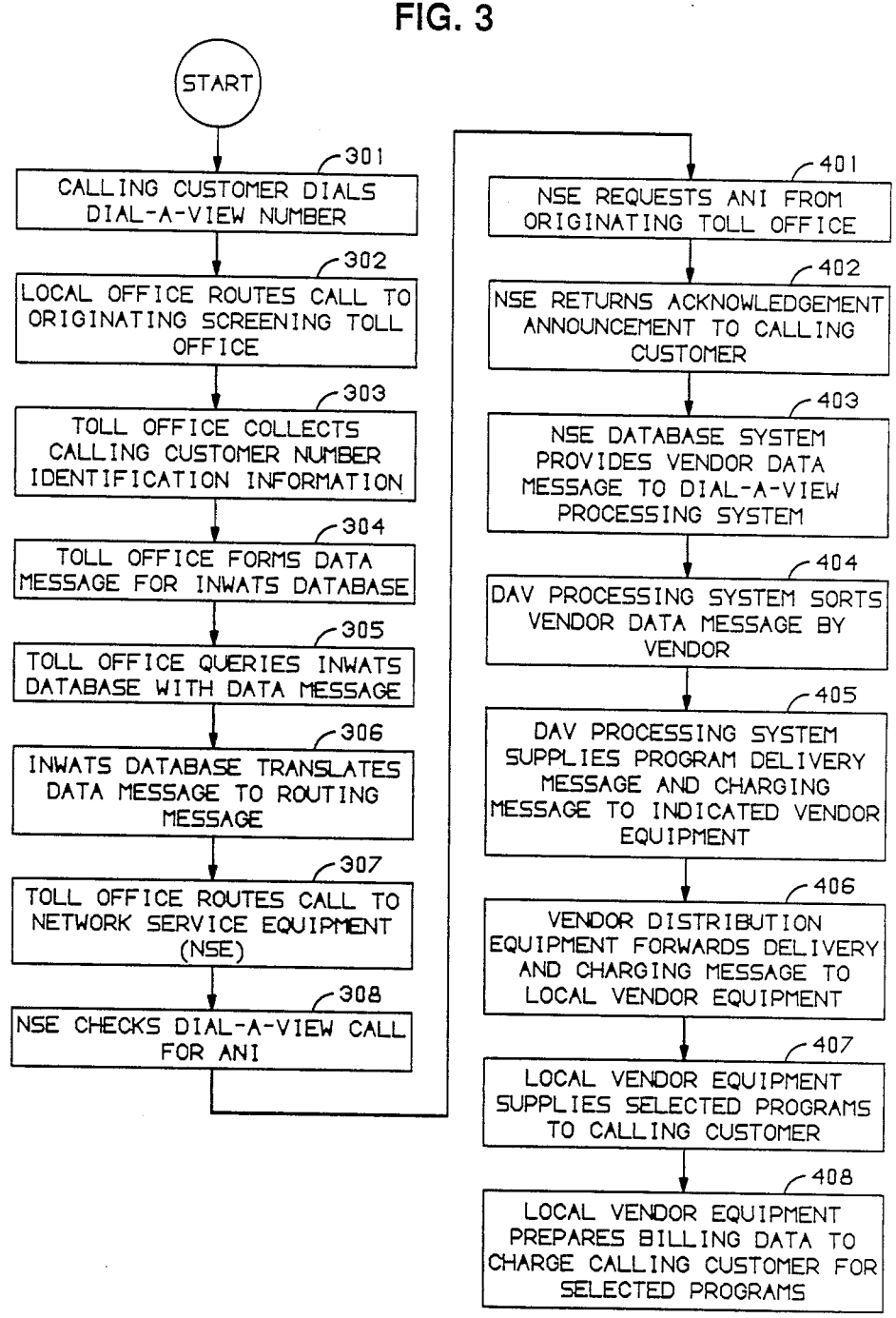
FIG. 3 depicts an illustrative flow diagram of a method deriving call routing information from a network routing database system for directing a dial-a-view call received by toll switching system to centralized network services equipment.

Depicted in FIG. 3 is a flow diagram illustrating one implementation of the method of deriving call routing information from a network database system for directing a dial-a-view call received by a toll switching office to centralized network services equipment. For purposes of illustration, it will be assumed that the customer at telephone station set 111 desires to view a particular programming selection on his television 105 received from local cable television vendor 147. To receive the desired selection, the calling customer has been directed to dial an INWATS "800" dial-a-view number indicating the desired programming selection. The calling customer at station set 111 dials the INWATS "800" dial-a-view number, where the specific "800" number identifies the next showing at a specified time of a pay-per-view program advertised with that telephone number (block 301).

Recognizing the call from station set 111 as an INWATS "800" call, local telephone switching office 109 routes the call to originating screening toll switching system office 102 (302). When local switching office 109 has equal access signaling capability, it forwards the well-known automatic number identification of the calling customer line to the originating screening toll office 102 (block 302). The toll office collects the calling line ANI (block 303) and forms a data message including the "800" dial-a-view number and the well-known area code of the calling customer line for forwarding to INWATS network routing database system 101 (block 304). When the local switching office does not have an equal access signaling feature, calling customer line number identification information is collected from the calling customer via well-known traffic service position system 120. In addition, well-known centralized automatic message accounting trunks may also collect calling customer ANI from non-equal access signaling local switching offices.

Toll office 102 queries INWATS database system 101 with the data message via the CCS network as it does for any INWATS "800" service call (block 305). However, network database system 101 translates the data message into a routing message that uniquely identifies the "800" dial-a-view call as a programming request (block 306). The routing message is of the form NPA-OXX-XXXX, which is a non-dialable number. The routing message NPA-OXX designates the centralized network services equipment 103 to which the dial-a-view call should be routed. When more than one centralized network services equipment is provided in the toll network. INWATS database 101 would provide a routing message directing the call to the centralized network services equipment serving the cable television vendor supplying the requested programming. This operation is descriptive of the advanced "800" service which is provided by AT&T and is more fully described in U.S. Pat. No. 4,191,860, issued to R. P. Weber, Mar. 4, 1980. Accordingly, the toll switching system 102 originates and transmit the dial-a-view call data message including the "800" dial-a-view number and the area code information to the INWATS database.

Upon receipt of the routing message from INWATS routing database 101, toll switching office 102 routes the dial-a-view call over voice communication line 151 and signaling line 156 to terminating toll switching office 113 in network services equipment 103 (block 307). As previously suggested, the "800" number of the data message may be translated to multiple routing numbers based on the calling customer's area code. Each routing message will then include a form such as 19X-wxy-NPAz. The 19X, uniquely identifies a dial-a-view call and the "wxy" identifies the network service equipment. The "wxyz" identifies a customer record at the network services equipment. The network services equipment includes terminating switching office 113. However, the network services functions may be incorporated into the originating screening toll office functions.

Terminating toll switching office 113, network services equipment 103 checks the "19X" dial-a-view code for calling customer number line identification information (block 308). When ANI is not included in the dial-a-view access code, the network services equipment requests the ANI from originating screening toll office 102 (block 401). When ANI is not available, terminating switching system 118 routes the call to a well-known CAMA operator at traffic service position system 121. The CAMA operator will collect the line number identification information from the calling customer and return the line number identification information to terminating toll switch 118.

Terminating toll switching office 113 will forward the ANI information and the "19X" dial-a-view number in a query message to network services database system 123 that will address a common dial-a-view call processing record. The network services database system will return a message to the terminating toll switching system 113 indicating that the call is a dial-a-view call. Terminating switching system 118 connects well-known mass announcement system 125 to the calling customer. The announcement system will provide an advisory signal such as acknowledgment announcement to the calling customer such as "thank you for ordering this programming" (block 402). In addition, charges for the call and supplying ANI to vendor equipment are stored in data memories 133 and 134 in a well-known manner.

Network services database system 123 compiles a vendor data message including the program request and calling customer number identification for dial-a-view processing system 124 (block 403). The vendor data message includes the requested programming and number information identifying the calling customer. Dial-a-view processing equipment 124 sorts the program request and calling customer line identification information by vendor and compiles a program delivery message and charging message for vendor equipment 104 to supply the requested programming (block 404). The dial-a-view processor system 124 applies the program delivery message and charging message to the indicated vendor equipment via one of data ports 140-145 such as data link 143 to vendor equipment 104 (block 405).

Vendor distribution equipment 146 including processor 180 forwards the program delivery and charging messages to the local vendor equipment servicing the calling customer via satellite facility 173 (block 406). Local processing equipment 181 of local vendor equipment 147 verifies calling customer's entitlement. Alternatively, as shown in FIG. 2, order verification equipment 204 has the records of all subscribing customers which are entitled to receive advertised programming. Accordingly, processor 205 will perform a check to verify that the calling customer is entitled to receive the selected programming. When not entitled, the processor notifies vendor personnel to solicit the customer for a subscription and billing information such as a credit card which can be verified on a dial-up basis.

In response to the program delivery message, local processing and distributing equipment 181 supplies the selected programming to the calling customers television 105 via addressable decoder 106 in a well-known manner (block 407). In addition, processing equipment 181 forwards the charging message to a local vendor billing system 182 which prepares billing data to charge the calling customer for the selected programming (block 408). Thus, a calling customer can receive selected programming by simply dialing a "800" dial-a-view number and receive the selected programming within minutes from the local cable television vendor.

It is to be understood that the above-described arrangement and method of providing nationwide dial-a-view service is merely an illustrative embodiment of the principles of this invention and that numerous other methods and arrangements may be devised by those skilled in the art without departing from the spirit and scope of this invention. In particular, this nationwide dial-a-view service and arrangement was described using well-known "800" service numbers in which the network services equipment bills the cable television for the INWATS "800" call. In another embodiment of this invention, a well-known "900" service number may be used in which the calling customer is charged for the call to the network services equipment. This "900" number does not utilize a separate network routing database. In addition, a special access data channel may be provided from the terminating switching office directly to the vendor equipment without having to go to separate network service database and dial-a-view processing systems. The details of the special access data channel and accompanying signaling protocol are provided in AT&T Communications Technical Reference PUB 41460, October, 1984. Thus, nationwide dial-a-view service is the electronic equivalent of having video cassettes delivered to your home. In addition, this telephone service can be used to provide a host of dial-up services indicated by the dialed "800" number.

What is claimed is:

1. A telecommunications network comprising:
   a first switching office responsive to a number from a calling station for controlling establishment of a call for requesting video programming identified by said number,
   a network routing database system serving at least one other switching office and said first office and responsive to said number for providing a routing message for said first office to route said call to network services equipment, and
   said network services equipment serving at least one other switching office and said first office and being responsive to said call for forwarding an identity of said identified video programming and information identifying said calling station to vendor equipment for supplying said identified programming to customer equipment identified by said calling station identifying information.

2. The network of claim 1 further comprising a plurality of said network services equipment and wherein said database system is responsive to a code identifying the area in which said first call originates for providing instructions for said switching office to route said call to one of said network services equipments serving said calling station.

3. The network of claim 1 wherein said network services equipment include means for communicating said data message to said vendor equipment.

4. The network of claim 1 wherein said network services equipment includes means for requesting said calling station identifying information from said calling station.

5. The network of claim 1 further comprising said vendor equipment which includes distribution means responsive to said video programming identity and said calling station identifying information for deriving a program delivery message and a charging message for said identified programming, and transmission means for communicating said program delivery and charging messages to local means for serving said customer equipment.

6. The network of claim 5 wherein said vendor equipment includes said local means which includes means responsive to said program delivery message for supplying said identified programming to said customer equipment and means responsive to said charging message for compiling billing data to charge said calling station for said identified programming.

7. The network of claim 1 further comprising a plurality of said vendor equipment each responsive to an individual one of a plurality of said numbers for deriving a program delivery message and a charging message indicative of predetermined programming and wherein said network services equipment includes processor means for compiling a data message for a particular one of said plurality of vendor equipment to supply said predetermined programming to said customer equipment.

8. The network of claim 1 wherein said network services equipment includes means responsive to said call for supplying an acknowledgment announcement to said calling station and
   wherein said network further comprises said vendor equipment which includes means responsive to said identity of said identified programming and said calling station identifying information for verifying entitlement of said customer equipment to receive said identified programming and
   local means operable under control of said verifying means for supplying said identified programming to said customer equipment.

9. The network of claim 8 wherein said local means comprises means for producing billing data to charge said calling station for said identified programming.

10. A telecommunications network comprising:
    a first switching office responsive to a number for controlling establishment of a call from a caller requesting video programming identified by said number,
    a network routing database system serving at least one other switching office and said first office and responsive to said number for providing a routing message for said first office to route said call to network services equipment,
    said network services equipment serving at least one other switching office and said first office and including means for requesting number information identifying said caller and means responsive to said identifying number information for compiling a data message including the identity of said identified programming and said identifying number information,
    means responsive to said data message for verifying entitlement of said caller to receive said identified programming.
    distribution means responsive to said data message for deriving a program delivery message and a charging message for said identified programming,
    means responsive to said program delivery message for supplying said identified programming to said caller, and
    means responsive to said charging message for compiling charge data for said identified programming.

11. The network of claim 10 wherein said network routing database system is further responsive to a code identifying the area in which said call originates for providing a routing message for said one office to route said call to one of a plurality of said network services equipment indicated by said area code.

12. A method of deriving call routing information from a network database system serving a plurality of switching offices for routing a dial-a-view call received by one of said offices to network services equipment serving said switching office and another switching office, comprising the steps of:
    receiving at said database system from said one office a dial-a-view call message including a dial-a-view number for establishing said call and indicating a television program requested by a caller,
    translating at said database system said call message into a routing message for controlling the routing of said call indicating said requested program to said network services equipment, and
    transmitting said routing message from said database system to said one office.

13. The method of claim 12 further comprising receiving at said one office said dial-a-view number entered by said caller,
transmitting said dial-a-view call data message including said dial-a-view number to said database system.

14. The method of claim 13 further comprising routing said dial-a-view call from said one office to said network services equipment in response to said routing message at said one office.

15. The method of claim 14 further comprising requesting from said one office number information identifying said caller and receiving at said network services equipment said number information identifying said caller.

16. The method of claim 15 further comprising compiling a vendor data message including said program request and said number information for subscription television vendor facilities to supply said requested program to said caller and to charge said caller for said requested program.

17. The method of claim 14 further comprising returning an acknowledgment announcement from said network services equipment to said caller in response to said dial-a-view call.

18. A telecommunications network comprising:
network services equipment serving a plurality of switching systems and including means responsive to a call routed thereto from one of said switching systems by a network routing database system serving said one switching system and at least one other switching system and initiated in response to service number signals from a caller served by said one switching system and requesting a selected service identified by said service number signals,
means responsive to said service call for supplying an acknowledgment to said caller, and
means responsive to number information identifying said caller for accessing service vendor equipment; and
said service vendor equipment comprising means responsive to said service number signals and said identifying number information for compiling a service delivery message and a charging message,
means for communicating said service delivery and charging messages to a local service facility serving said caller for enabling the delivery of said identified service, and
means for verifying the entitlement of said caller to receive said identified service.

19. The network of claim 18 wherein said local service facility includes means responsive to said charging message for producing caller charge data.

20. A method of ordering a selection through a telecommunications network comprising the steps of:
receiving at a first switching system serving said network a number for controlling establishment of a call to network services equipment serving said network and for identifying said selection,
translating at a routing database system serving said first switching system and another switching system said number into a routing message including information for identifying said selection for said first switching system to route said call to said network services equipment.
routing said call to said network services equipment in response to said routing message,
obtaining information for identifying said caller, and
compiling in response to said information for identifying said selection and said caller at said network services equipment serving another switching system and said first switching system a data message for vendor facilities to supply said selection to said caller.

21. The method of claim 20 further comprising charging said caller for said selection in response to said data message.

22. The method of claim 20 further comprising supplying said selection to said caller in response to said data message, and
charging said caller for said selection in response to said data message.

23. The method of claim 20 further comprising
returning an acknowledgment announcement from said network service equipment to said caller in response to said dial-a-view call at said network services equipment.

24. A method of charging for a call routed in response to a telephone number to network services equipment under control of a network database system serving a plurality of switching systems, said call for automatically requesting a selection specified by said telephone number, comprising:
deriving at said network services equipment in response to said call a charge for said call routed thereto under control of said network database system, and
deriving at said network services equipment a charge for supplying selection supply facilities a message indicating said selection.

25. A method of charging for a call routed in response to a telephone number to network services equipment under control of a network database system serving a plurality of switching systems, said call for automatically requesting a selection specified by said telephone number, comprising:
deriving at said network services equipment a charge for said call routed thereto under control of said network database system,
obtaining at said network services equipment caller identification for said call, and
deriving at said network services equipment a charge for supplying selection supply facilities with said caller identification and said selection specified by said telephone number.

26. The method of claim 25 further comprising deriving at said network services equipment a charge for supplying said selection.

27. A call processing method comprising
extending a call ordering a video program from a calling station to network services equipment serving a plurality of switching office via one of said switching offices under control of a call routing database system serving said one switching office and at least one other switching office,
supplying an advisory signal on said extended to call to said calling station,
deriving at said network services equipment an identity of a chargeable entity for said call,
verifying an entitlement of said chargeable entity to receive said video program in response to said derived identity, and
supplying said video program to a designated station in response to said entitlement of said chargeable entity to receive said video program.

28. The method of claim 27 wherein supplying said video program comprises compiling a program delivery message and a charge message for said video program, supplying said video program to said designated station from a local supply facility in response to said program delivery message, and charging said chargeable entity for said video program in response to said charge message received at said local supply facility.

29. The method of claim 27 further comprising
translating at said routing database system a number identifying said call to a routing message and
routing said call from said one office to said equipment in response to a receipt of said routing message at said one office.

30. The method of claim 27 further comprising
deriving at said equipment a charge assessment for said call in response to said call.

31. The method of claim 27 further comprising deriving at said equipment a charge for supplying said derived identity of said chargeable entity for said call.

32. The method of claim 27 further comprising
deriving at said equipment a charge for supplying said video progam to said designated station in response to said identity of said chargeable entity for said call.

33. The method of claim 27 further comprising requesting at said equipment said identity of said chargeable entity from said office.

34. A telecommunications network responsive to a number identifying a video program from a telephone office for deriving routing information for a call identified by said number comprising
routing database means serving a plurality of switching offices for translating said number to routing information for said call,
network services equipment for serving said switching offices and processing said call for video programming supply facilities, and
one of said offices being responsive to said routing information for extending said call to said network services equipment,
said equipment comprising means responsive to information identifying a caller for compiling a data message for said supply facilities to identify said video program and said caller.

35. The network of claim 34 further comprising means for supplying an advisory signal to said one office.

36. The network of claim 34 wherein said equipment further comprises means for deriving a charge for said call.

37. The network of claim 34 wherein said equipment further comprises means responsive to the caller identifying information for deriving a charge for compiling said message for said supply facilities.

38. Video suppy processing equipment comprising:
means responsive to a data message from network services equipment serving a plurality of switching systems of a telephone network, said data message specifying caller telephone number identification information for identifying a caller and also specifying number information for identifying a video service requested by said caller and for establishing a call to said network services equipment via said telephone network, for verifying whether or not said caller is entitled to receive said video service, and
means responsive to a determination by said verification means that said caller is entitled to receive said video service for producing a service delivery message for a video supply facility to provide said video service to said caller.

39. The equipment of claim 38 further comprising means for supplying information advising said caller that said caller is not entitled to receive said requested service.

40. Video supply processing equipment comprising:
means responsive to a data message specifying caller identification information and a dial-a-view number specifying a video service requested by a caller via a telephone network for verifying whether or not said caller is entitled to receive said video service,
means responsive to a determination by said verification means that said caller is entitled to receive said video service for producing a service delivery message for a video supply facility to provide said video service to said caller,
means responsive to a determination by said verification means that said caller is not entitled to receive said video service for supplying information advising said caller that said caller is not entitled to receive said requested service, and
means responsive to billing information from said caller for verifying said billing information.

41. The equipment of claim 40 further comprising means responsive to the verification of said billing information for controlling the operation of said means for producing said service delivery message.

42. The equipment of claim 38 further comprising billing means responsive to said data message when said caller is entitled to said video service for charging said caller for said video service.

43. The equipment of claim 38 further comprising means responsive to said program delivery message for supplying said video service.

44. The network of claim 1 wherein said network services equipment comprises
means responsive to said calling station identifying information for compiling a data message including said identity of said identified programming and said calling station identifying information, and
means responsive to said data message for compiling a program delivery message and a charging message for said vendor equipment.

45. The network of claim 1 further comprising said vendor equipment being responsive to said identity of said identified video programming and said calling station identifying information for supplying said identified programming to said customer equipment.

46. An arrangement for deriving call routing information from a network database system serving a plurality of switching offices for routing a call received by one of said offices to network services equipment serving said one switching office and another switching office, comprising:
means for receiving at said database system from said one office a call message including an identification number for establishing said call and identifying an order selection requested by a caller,
means for translating at said data base system said call message into a routing message including information identifying said selection for routing said call from said one office to said network services equipment, and means for transmitting said routing message from said database system to said one office.

47. A telecommunications network comprising:
a switching system responsive to a number from a caller for controlling establishment of a call to network services equipment and for requesting a selection identified by said number,
a database system serving said switching system and at least one other switching system and responsive to said number for providing a routing message for said switching system to route said call to said network services equipment, and
said network services equipment serving said switching system and at least one other switching system and being responsive to said call for forwarding information identifying said selection and said caller to vendor equipment for supplying said selection to said caller.

48. Network services equipment for serving a plurality of switching systems comprising:
a network switching system responsive to a call from one of said systems for obtaining information identifying a calling station originating said call and a selection,
database means or compiling a data message including said information identifying said calling station and said selection, and
means for forwarding said data message to vendor equipment for supplying said identified selection.

49. The network services equipment of claim 48 further comprising means responsive to said call for supplying an acknowledgement announcement to said calling station.

50. An interconnect carrier switching system serving a plurality of local exchange switching systems comprising:
means responsive to a call from a calling station having an identity and servied by one of said local exchange systems, said call being originated with a number identifying an order selection requested from said calling station, for obtaining said calling station identity from either said one local exchange system or said calling station; and
means responsive to said selection identifying number for extending said call, including forwarding said calling station identity and information identifying said selection specified by said selection identifying number, to network services equipment serving said interconnect carrier switching system and at least one other switching system.

* * * * *

UNITED STATES PATENT AND TRADEMARK OFFICE
CERTIFICATE OF CORRECTION

PATENT NO. : 4,763,191

DATED : August 9, 1988

INVENTOR(S) : Travis H. Gordon, Steven D. Simon, Robert Sorrentino

It is certified that error appears in the above-identified patent and that said Letters Patent is hereby corrected as shown below:

Column 1, between lines 4 and 5 insert --RELATED APPLICATION--
Column 1, line 67, "for" should be "are"
Column 6, line 57, "servies" should be "services"
Column 9, line 20, delete the period and insert a comma IN THE CLAIMS
Column 12, line 50, "one" should be "first"
Column 12, line 57, after "said" insert --one--
Column 15, line 56, after "said", first occurrence, insert --data--
Column 18, line 1, "or" should be "for"
Column 18, line 14, "servied" should be "served"

Signed and Sealed this

Tenth Day of April, 1990

Attest:

HARRY F. MANBECK, JR.

*Attesting Officer*     *Commissioner of Patents and Trademarks*